(12) United States Patent
Tse et al.

(10) Patent No.: US 6,198,845 B1
(45) Date of Patent: Mar. 6, 2001

(54) METHOD FOR DETERMINING DOCUMENT BACKGROUND FOR ADJUSTING THE DYNAMIC RANGE OF AN IMAGE OF THE DOCUMENT

(75) Inventors: Francis K. Tse, Rochester; Barbara L. Farrell, Ontario; Ramesh Nagarajan, Fairport; Andre M. Blaakman, Webster; Richard S. Fox, Rochester; George W. Lahue, Canadaigua; Thomas I. Yeh, Penfield, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 08/886,205

(22) Filed: Jul. 1, 1997

(51) Int. Cl.$^7$ .............................. G06K 9/00; G06K 9/40; G09G 5/10; H04N 1/40
(52) U.S. Cl. .......................... 382/169; 382/167; 382/260; 382/274; 382/275; 345/147; 358/455
(58) Field of Search .................................. 382/167, 169, 382/268, 171, 260, 262, 264, 274, 275; 358/464, 522, 455, 461; 345/147

(56) References Cited

U.S. PATENT DOCUMENTS

| 5,046,118 | * | 9/1991 | Ajewole et al. ...................... 382/169 |
| 5,164,993 | * | 11/1992 | Capozzi et al. ...................... 382/169 |
| 5,544,258 | * | 8/1996 | Levien ................................. 382/169 |
| 5,832,105 | * | 11/1998 | Morimoto et al. .................... 382/171 |
| 5,848,181 | * | 12/1998 | Ogata .................................. 382/169 |

* cited by examiner

Primary Examiner—Leo H. Boudreau
Assistant Examiner—Daniel G. Mariam
(74) Attorney, Agent, or Firm—Oliff & Berridge, PLC

(57) ABSTRACT

The background grey-level of a document is determined based on the gain of the document. A histogram is generated and compressed. The standard deviation of the distribution curve of the compressed histogram is determined. A gain factor is determined using the mean and standard deviation. Using the background grey-level, the dynamic range of the document is adjusted.

29 Claims, 12 Drawing Sheets

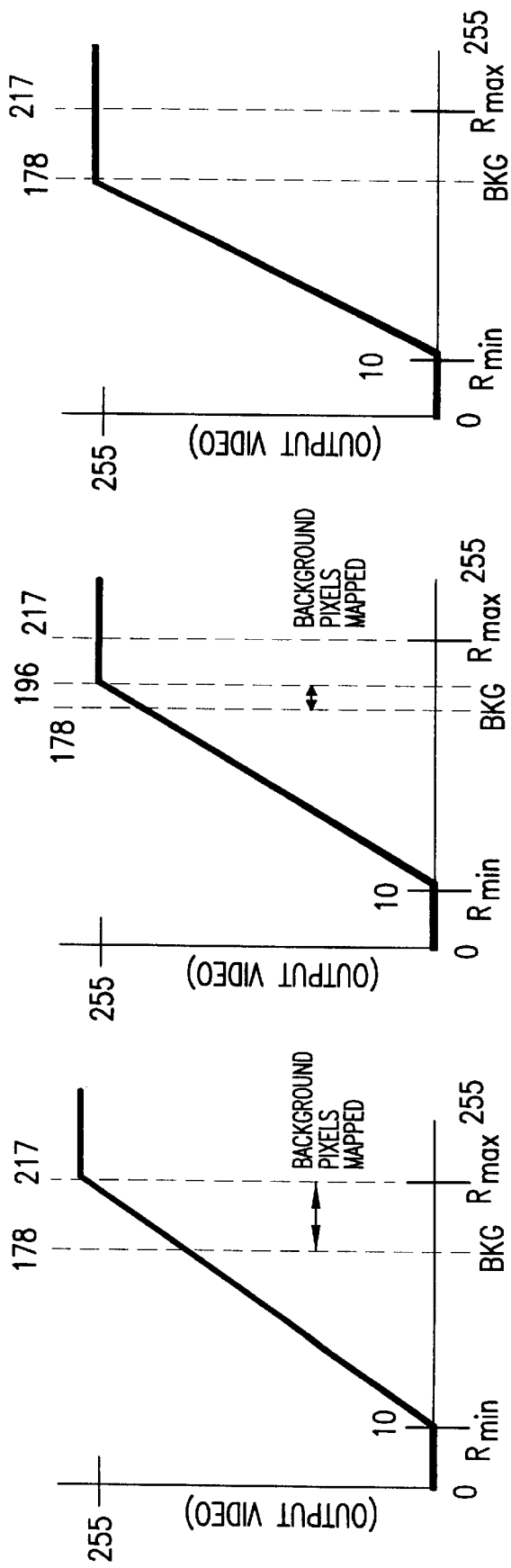

METHOD FOR DETERMINING DOCUMENT BACKGROUND FOR ADJUSTING THE DYNAMIC RANGE OF AN IMAGE OF THE DOCUMENT

BACKGROUND OF THE INVENTION

1. Field of the Invention

This invention pertains to methods and apparatus for determining background content of an image of a scanned document. More particularly, this invention relates to a method for determining the document background and suppressing its effects on document copies. This invention also relates to methods for adjusting the dynamic range of the image.

2. Description of Related Art

In copier systems, copying a document (or more generally, an original) while suppressing the substrate of the original is often required, such as when the original is printed on colored paper. Background detection can be performed on just the leading edge of the document or the whole document. However, whole page background detection generally requires pre-scanning the entire original. The detected background can be removed by adjusting the gain of the scanned image and clipping the values that exceeds the system processing range.

One approach to estimating the original's background value is by performing a running average in an area of the original where there is just background. This approach also blocks using any video below a selectable threshold just in case non-background material is included in the selected area. This running average approach works well with pure background, but performs poorly when non-background material is present, especially when the non-background material occurs at the edge of the window where the final average is most affected.

Automatic background suppression senses the background and automatically suppresses the background before final printing. Conventional automatic background suppression systems generate a histogram of the document using standard methods and then calculate the mean and standard deviation. This often involves significant amounts of calculation to determine the gain needed to eliminate the background noise.

To further prevent gross loss of image detail of an input document, the dynamic range should also be adjusted. FIG. 11A shows an image of a newspaper photograph with no background noise elimination or dynamic range adjustment.

SUMMARY OF THE INVENTION

This invention provides an improved method for estimating the background grey-level of an image of a scanned document.

This invention further provides an improved method for adjusting the dynamic range of an image via a tone reproduction curve map.

This invention also provides a method that is simple but which meets the requirements for determining the background value. Together with estimating the mean value of the background, one method of this invention estimates the standard deviation of the background so that background suppression can be optimized.

The method of this invention produces a single number called gain. A histogram of the image values in a selected area of the document is inputted. Alternately, the image values are subsampled before generating the histogram. The sub-sampling approach does not affect the calculation of the gain number and may be used to reduce the hardware requirements. The histogram is then smoothed. In general, histogram data tends to be noisy and smoothing of the data is desirable.

Smoothing the histogram is accomplished by adding the occurrence frequencies in four adjacent bins of the histogram, placing the sum in a new bin and dividing the sum by four. An original histogram with 256 bins is therefore compressed into a histogram of 64 bins.

Next, the approximate shape of the histogram is determined, where the bin frequency is a function of the bin number. Although a number of methods for solving for the coefficients in the preferred embodiment of this equation could be used, a second order polynomial is used that is fit through three points of the compressed histogram.

The selected points include the frequency value in the bin with the highest occurrence frequency and the frequency values in the bins on each side of the bin having the highest occurrence frequency. Then, the standard deviation of the distribution curve of the compressed histogram is determined. Finally, the standard deviation is used to determine the gain factor.

An alternative method estimates the statistics of the document background. A small sampling window is applied to the lead edge of a document to generate a 64-bin histogram. The peak occurrence frequency value of the histogram and its neighboring points are indicated by the grey-level values and the corresponding histogram frequencies are determined. The background mean grey level is determined using a weighted average of the three grey-level values thus obtained. The three sets of Cartesian coordinates and the determined mean are directly used in the normal distribution equation to determine the standard deviation. The standard deviation is then used to determine the gain factor for the document. The gain factor is used to estimate the background grey level of the image of the scanned document.

The determined background grey-level is then used to adjust the dynamic range of the image via a tone reproduction curve map. Instead of mapping the entire input grey-level space, only the input grey-level space from the image reflectance value to the established background level of the image is mapped. Instead of limiting the output grey-level space, the input grey-levels are mapped to a range extending from zero to the calibrated "whitest white" of the system, using the full available dynamic range. This increases the resolving power and reduces the line edge noise to improve the shadow detail rendition in halftone pictorials rendered by a single threshold.

These and other features and advantages of this invention are described in or apparent from the following detailed description of the preferred embodiments.

BRIEF DESCRIPTION OF THE DRAWINGS

The preferred embodiments of this invention will be described in detail, with reference to the following figures, wherein:

FIGS. 10A–10C are the tone reproduction curve map of Equations 17, 18 and 19.

DESCRIPTION OF THE PREFERRED EMBODIMENTS

Figure 1:
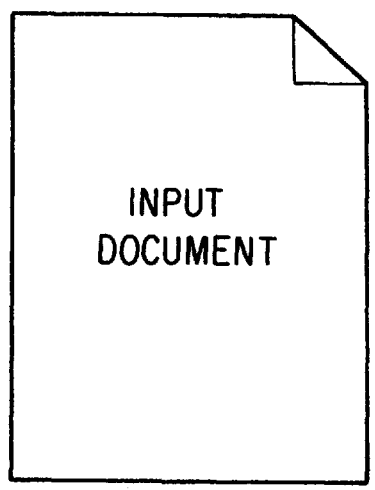
FIG. 1 is an input document.
Figure 2:
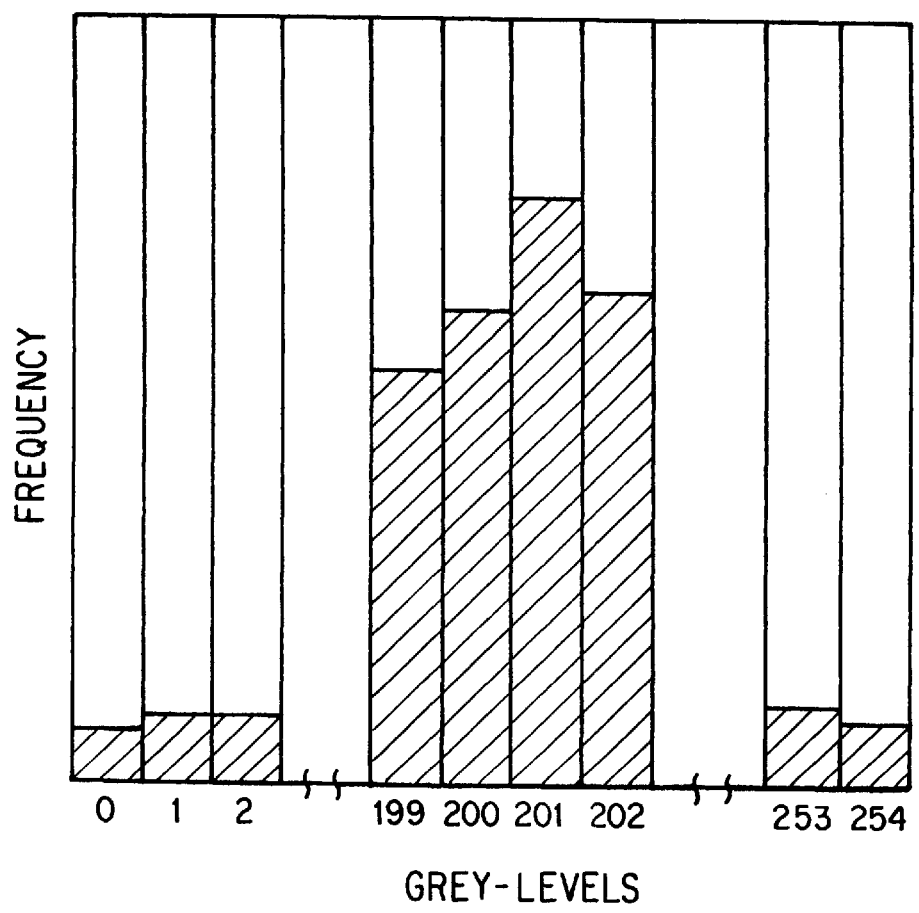
FIG. 2 is a histogram of the input document.
Figure 3:
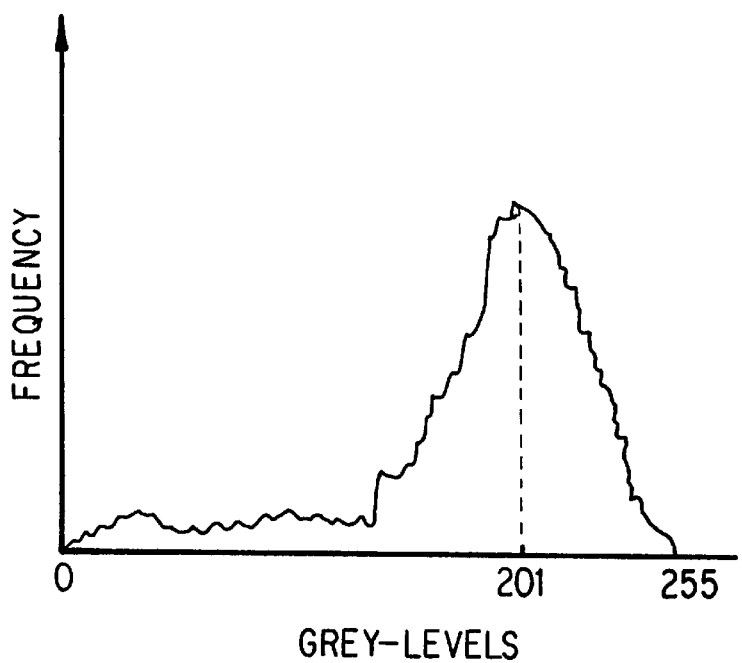
FIG. 3 is a graphical representation of the histogram of the input document.

FIG. 1 shows an input document. The input document is scanned and analyzed to generate the histogram shown in FIG. 2. Preferably, a small sampling window of approximately 4,000 pixels by four scanlines is applied to the leading edge of the input document to generate the histogram. The histogram of the input document shown in FIG. 2 is a 256-value histogram of the grey levels of the input document, wherein a grey-level of 0 represents the black pixels and a grey-level of 255 represents the white pixels. The pixel value having the highest frequency in the sampling window represents the mean grey-level of the background. For example, the mean grey-level of the background of the input document is "201," as shown in FIGS. 2 and 3. FIG. 3 is a graphical representation of the histogram shown in FIG. 2.

Figure 4:
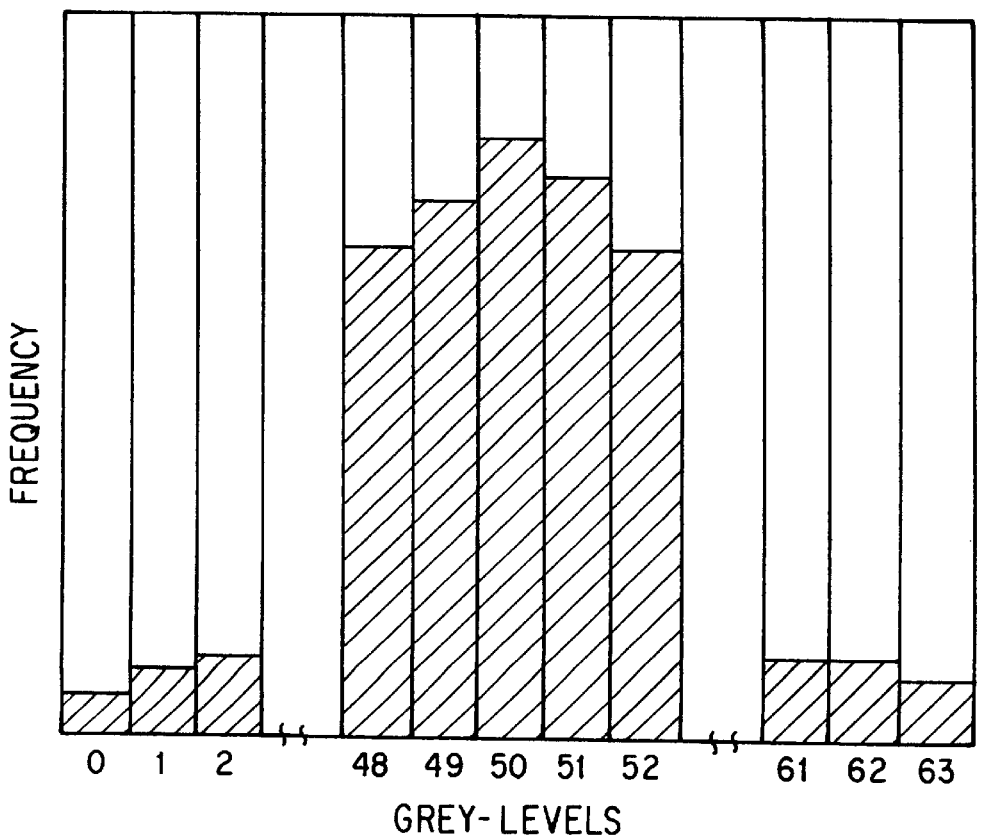
FIG. 4 is a compressed or smoothed histogram of the input document generated from the histogram of FIG. 3.
Figure 5:
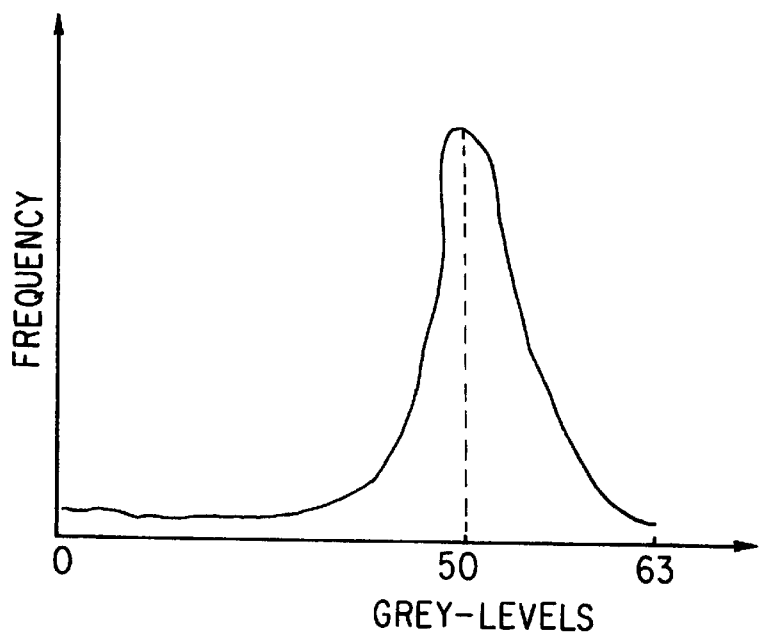
FIG. 5 is a graphical representation of the compressed or smoothed histogram of the input document generated from the histogram of FIG. 3.

The generated histogram is then smoothed or compressed. In general, histogram data tends to be noisy and smoothing the histogram data is desirable. One preferred approach to smoothing the histogram is to combine pixel values. In the preferred embodiment of the method of this invention, the range of grey-level values is divided into non-overlapping subsets of four values each. The frequency values for the four grey-level values in each subset are added together and divided by four to obtain an average frequency value for each subset of grey-level values. These new grey-level values represent different grey-levels in the input document, ranging from the darkest grey-level value to the lightest grey-level value. Thus, an original histogram with 256 grey-level values, for example, is compressed into a histogram of 64 grey-level values, as shown in FIG. 4. FIG. 5 is a graphical representation of the compressed histogram shown in FIG. 4. In particular, the background mean grey-level of the input image is represented by a value of grey-level 50 in the compressed histogram shown in FIGS. 4 and 5. This value of 50 is an estimation of the background mean grey-level value due to the smoothing process. The exact mean grey-level value will be determined as detailed below.

Devices capable of scanning an input document, generating a histogram of the input document and compressing the histogram are well known in the art. Thus, a detailed description of the operation of these devices is omitted.

The first embodiment of the method of this invention then approximates the shape of the histogram using a second order polynomial of the form:

$$y=ax^2 bx+c \quad (1)$$

where:

y is the grey-level value frequency, i.e., the number of pixels having that grey-level value; and x is the grey-level value.

The second order polynomial is fit to three points of the compressed histogram. The points selected include the grey-level frequencies of the grey-level value having the highest frequency and the grey-level values immediately adjacent to the grey-level value having the highest frequency in the compressed histogram. In another preferred approach, the grey-level having the highest frequency is selected and the two neighboring grey-level values having frequencies closest to $e^{-0.5}$ times the highest frequency are located. This results in a slightly improved prediction and a more general solution since it is not restricted to only two possibilities. The equations that represent the three points, corresponding to the highest occurrence frequency and the two adjacent grey-level values, are:

$$y_1=ax_1^2+bx_1+c;$$

$$Y_2=ax_2^2+bx_2+c; \text{ and}$$

$$y_3=ax_3^2+bx_3+c.$$

where:

$y_i$ represents the y-coordinate on the histogram (i.e. the occurrence frequency) of the ith point; and $x_i$ represents the x-coordinate on the histogram (i.e. the grey-level value) of the ith point.

Linear algebra can be used to solve for the coefficients a, b and c. The curve generated by the resulting equation closely approximates the compressed histogram of the background video data. The peak value of the curve and its spread or standard deviation can then be calculated.

Assuming the histogram has a normal probability distribution and that the curve of the quadratic equation and the curve of the normal probability function are equivalent in the region near the curve peak, the distribution curve is:

$$y=Ke^{-((x-x_m)^2/2\sigma)} \quad (2)$$

where:

$X_m$ is the x-coordinate value of the mean;

K is the y-coordinate value of the mean;

σ is the standard deviation.

When approximating the points to a normal distribution, $X_m$ is equivalent to $x_{max}$ and $y_m$ is equivalent to $y_{max}$ of the curve of the quadratic equation.

The value of x at one standard deviation from $x_m$ is:

$$x=x_m+\sigma. \quad (3)$$

Solving for σ gives:

$$\sigma=x-x_m. \quad (4)$$

The value of y at that point is:

$$y=y_m e^{-0.5}. \quad (5)$$

From the quadratic equation, the value of x is:

$$x=(-b+(b^2-4a(c-y))^{1/2})/2a. \quad (6)$$

Substituting Equation 3 and Equation 5 into Equation 4 gives:

$$\sigma=((-b+(b^2-4a(c-y_m e^{-0.5}))^{1/2})/2a)-x_m \quad (7)$$

The gain factor is the final output and is defined as the "white" pixel value, i.e., a grey-level value of 255, divided by the background "white" pixel value of the input document $V_w$. $V_w$ is defined as:

$$V_w = X_m - n\sigma \tag{8}$$

where n is an arbitrary multiplier. Thus, the gain G is:

$$G = 255/V_w. \tag{9}$$

Figure 6:
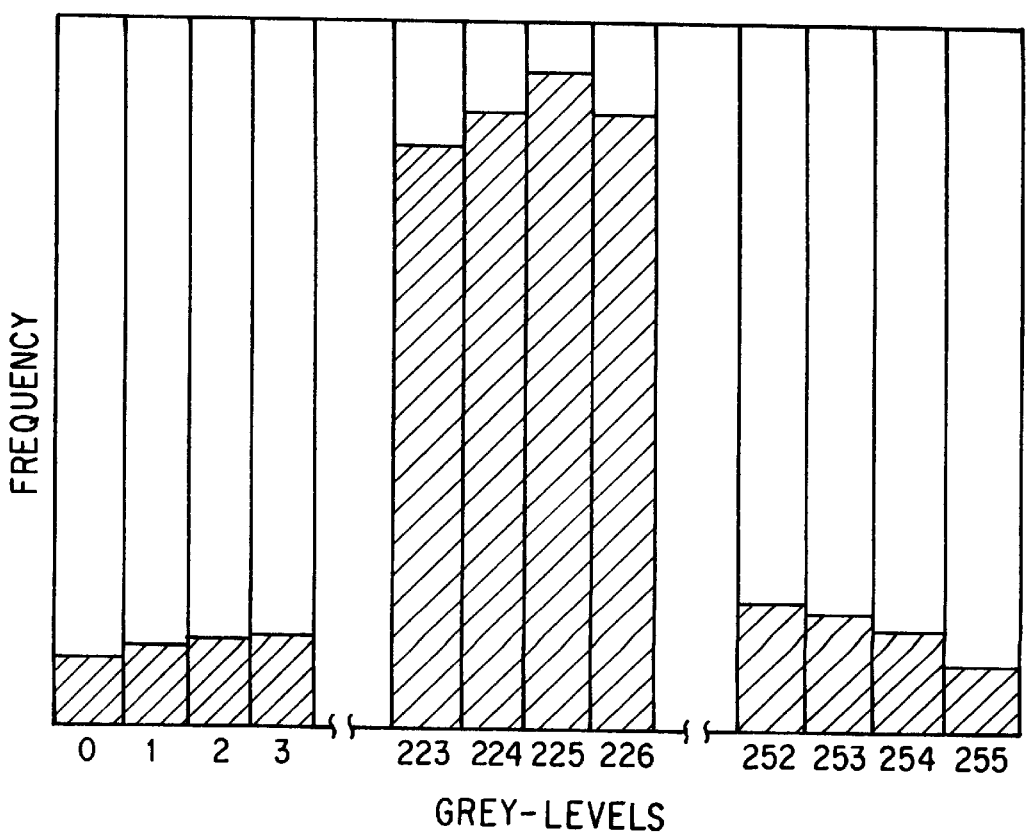
FIG. 6 is another histogram of the image of the input document.
Figure 7:
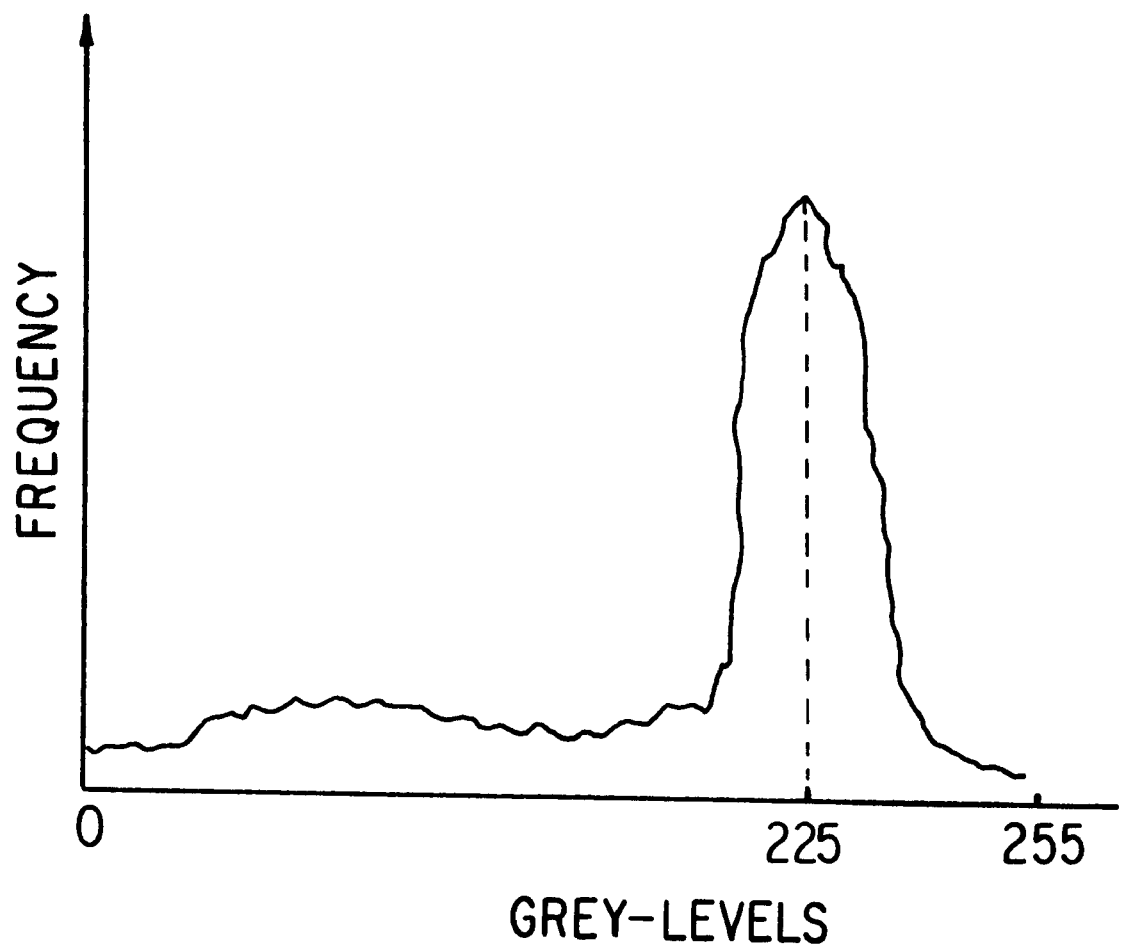
FIG. 7 is a graphical representation of the other histogram of the image of the input document.

The gain G is then multiplied by the grey-level values 0 to 254 of the histogram shown in FIG. 1 to obtain the histogram of the image of the input document shown in FIG. 6. As shown in FIG. 7, the peak of the histogram of the image of the input document is shifted to a value of 225, i.e., towards the grey-level "white" value of 255, from a value of 201. Thus, the background grey-level value BKG of the image of the input document is represented by a grey-level value of 225. In the histogram of the image of the input document, any grey-level value exceeding a value of 225 is clipped.

Figure 8:
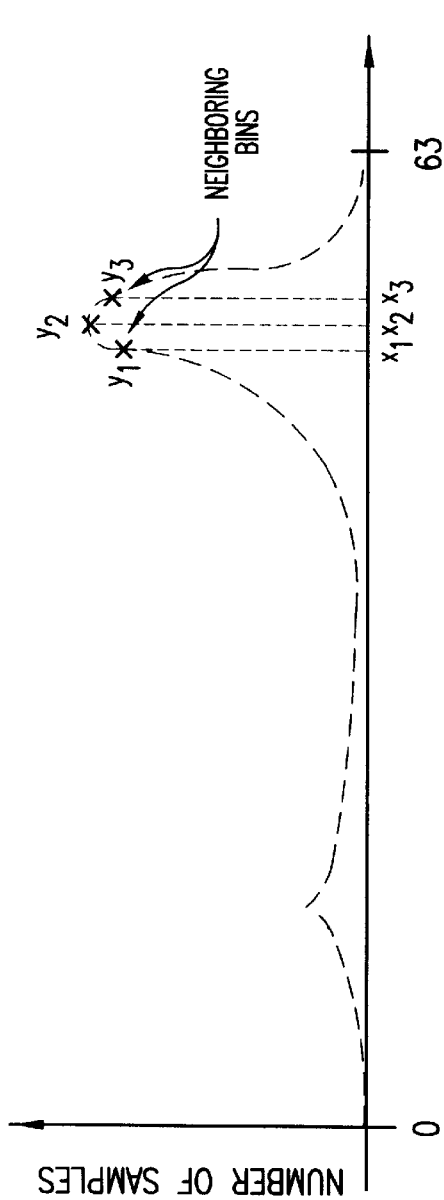
FIG. 8 is a is a graphical representation of a compressed or smoothed histogram generated from the histogram of FIG. 7.

A second preferred embodiment of the method for determining the standard deviation of the compressed histogram of the input document initially includes determining the peak $(x_2, y_2)$ of the compressed histogram and its neighboring points $(x_1, y_2)$ and $(X_3, y_3)$ as shown in FIG. 8, where $x_1$, $x_2$ and $x_3$ are the grey-level values and $y_1$, $y_2$ and $y_3$ are the corresponding histogram occurrence frequency values.

Figure 9:
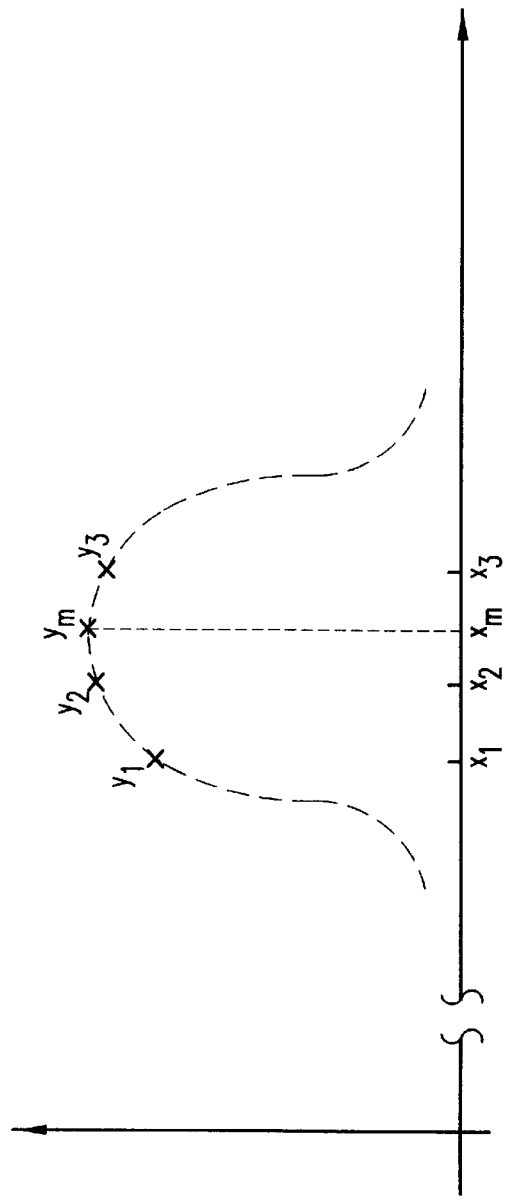
FIG. 9 is a larger scale graphical representation of a compressed or smoothed histogram.

Next, as shown in FIG. 9, the background mean grey-level is determined using a weighted average of the three grey-level values previously obtained:

$$\text{Mean } (x_m) = \frac{\sum x_i y_i}{\sum y_i}, \quad i = 1 \text{ to } 3. \tag{10}$$

Finally, instead of fitting the three sampled points into a quadratic equation and approximating the result to a normal distribution, as in the first preferred embodiment, the three Cartesian coordinates and the computed mean are directly used in the normal distribution equation. The normal distribution equation is:

$$y = Ke^{-((x-\mu)^2/2\sigma^2)} \tag{11}$$

where $\mu$ and $\sigma$ are the mean and the standard deviation of the distribution, respectively. By approximating the points to a normal distribution, the following equations are obtained:

$$\mu = x_m; \text{ and} \tag{12}$$

$$K = Y_m. \tag{13}$$

Using two Cartesian pairs and the value of $x_m$, the standard deviation for the distribution is:

$$\sigma = \sqrt{\frac{8(x_2 + x_p - 2x_m)}{\log_e(y_2/y_p)}}. \tag{14}$$

The factor of 8 arises due to the interpolation required to interpolate the 64-value histogram values $x_i$ into 256 grey levels. To solve for the standard deviation of the normal distribution, two points are needed since $y_m$ is an unknown variable. In the second preferred embodiment of the method, the peak $(x_2, y_2)$ and the closest x-axis coordinate xp to the value of $x_m$ and its corresponding y-axis coordinate $(x_p, y_p)$ are preferably used. For example, in FIG. 9 $(x_p, y_p) = (x_3, y_3)$. However, if there is little variation in the y-axis coordinates and $y_3$ is closer to $y_2$ than $y_1$ is to $y_2$, then $(x_p, y_p)$ is preferably set to $(x_1, y_1)$ instead of $(x_3, y_3)$.

The gain factor G is thus:

$$G = 255/(V_w - V_b) \tag{15}$$

where $V_b$ is the lowest or "blackest" grey-level value of the histogram of the input document. Ideally $V_b$ is equal to zero. $V_w$ is defined as:

$$V_w = x_m - L_w(3\sigma + 0.108 + 0.0948 x_m) \tag{16}$$

where $L_w$ is a constant.

To convert images into binary information, a single fixed threshold is often applied. If a pixel in the image is above a threshold level, a binary "1" is produced, otherwise, a binary "0" is produced. Selecting a fixed threshold value is thus critical. Using a threshold value which is too high results in an unnecessary loss of information. In contrast, a threshold value which is too low brings out objectionable background noise.

However, selecting the threshold is non-trivial. Locating the threshold value by trial and error with test prints or displays can be used to select the threshold value. However, this method is unsatisfactory. Preferably, the threshold value should be selected automatically.

One method for automatically selecting the threshold value uses a fixed, nominal threshold value which is one-half the available dynamic range. This method then modifies the dynamic range of an image via a linear transformation, (i.e., a tone reproduction curve map). Ideally, the tone reproduction curve map should produce the best shadow and detail rendition without reproducing the background pixels of the image.

One preferred method for modifying the dynamic range is:

$$P_{NEW} = (P_{OLD} - R_{MIN}) * \frac{(Z_{MAX} - Z_{MIN})}{(R_{MAX} - R_{MIN})} \tag{17}$$

where:

$P_{NEW}$ is the adjusted pixel grey-level value;

$P_{OLD}$ is the original pixel grey-level value;

$(Z_{max} - Z_{min})$ is the largest possible dynamic range for the system;

$R_{max}$ is the image reflectance value where the sum of the image area which contains reflectances above $R_{max}$ is less than a prescribed percentage of the total image area; and $R_{min}$ is the image reflectance value where the sum of the image area which contains reflectances below $R_{min}$ is less than a prescribed percentage of the total image area.

$R_{min}$ and $R_{max}$ allow a greater "range," in order to stretch the rest of the grey levels. However, $R_{max}$ and $R_{min}$, instead of the absolute minimum and maximum reflectance values within an image, cause Eq. 17 to effectively compress the grey level ranges of $P_{OLD} < R_{min}$ and $P_{OLD} > R_{max}$ by saturating them. This is usually tolerable, because very few pixels have grey levels in these ranges. Thus, little image information is lost.

A second preferred method for modifying the dynamic range is:

$$P_{NEW} = (P_{OLD} - R_{MIN}) * \frac{\text{white}}{(BKG - R_{MIN})} \tag{18}$$

where:

BKG is the image background grey level as determined above; and

"white" is the reflectance of white paper or the "whitest white" determined during a scanner calibration process.

Eq. 18 differs from Eq. 17 in that instead of the entire input grey-level range of the particular image being mapped, as in Eq. 17, only those grey-levels between Rmin and the background level of the document are mapped by Eq. 18.

FIGS. 10A and 10B show the difference in the tone reproduction curves resulting from Equations 17 and 18, respectively, wherein $R_{min}=10$, $R_{max}=217$, and the image background is determined as 178. Both methods slide the peak of the histogram to the left 10 grey-levels ($R_{min}$). This maps more grey-levels to saturated black, increasing the contrast and the effective sharpness of the image.

When the maximum output dynamic range is 255, the first preferred method produces a linear map which maps input grey levels between $R_{min}$ and $R_{max}$ to output grey-levels 0 to 255. Note that for this example, all grey-levels between $R_{min}$ and $R_{max}$ will be mapped to the full grey scale range of 0 to 255, although the range could have been compressed by using the whitest white instead of 255.

For this example, the second preferred method produces a linear map between $R_{min}$ and the background value. Thus, a smaller subset of the grey-levels will be mapped to the output grey scale range from zero to "white", the reflectance of white paper. Pixels having grey-level values above the background grey-level value will be saturated. However a smaller number of grey-level values will be mapped to available grey-levels using the second preferred method. The second preferred method maps more dark inputs grey pixels to the output, so more shadow detail will be visible. However, 21 grey-levels ($R_{max}$–196) in the highlight region will be saturated white. This may result in some visible, saturated white areas in the resultant image.

The tone reproduction curve maps generated by the two methods are often quite similar. If the difference between the image background and $R_{max}$ is relatively small (<20), the tone reproduction curve map generated by the second preferred method approaches the tone reproduction curve generated for the first preferred method. If the maximum dynamic range in the first preferred method is decreased, the saturation point moves higher than $R_{max}$ This effectively maps more input grey-levels in the highlight region, but wastes output grey-levels, since input grey levels higher than $R_{max}$ will be mapped instead of saturated.

If the "white" term in Equation 18 is changed to "255" or the maximum possible output grey-level range, the transformation becomes a shift and linear stretch between $R_{min}$ and the image background. This is illustrated in FIG. 10C. Thus, all pixels having grey levels above the image background level will be saturated white. This will also map more dark input grey-levels to the available range, but fewer light input grey-levels. This improved method of dynamic range modification is given by:

$$P_{NEW} = (P_{OLD} - R_{MIN}) * \frac{(Z_{MAX} - Z_{MIN})}{(BKG - R_{MIN})} \quad (19)$$

where:

$P_{new}$ is the adjusted pixel grey-level value;

$P_{OLD}$ is the original pixel grey-level value;

$(Z_{max}-Z_{min})$ is the largest possible dynamic range for the system;

$R_{min}$ is the image reflectance value, such that the sum of the image area which contains reflectances below $R_{min}$ is less than a prescribed percentage of the total image area; and BKG is the image background grey-level as determined above.

Figure 11A:
FIGS. 11A–11D are images of a newspaper photograph.
Figure 11B:
Figure 11C:
Figure 11D:
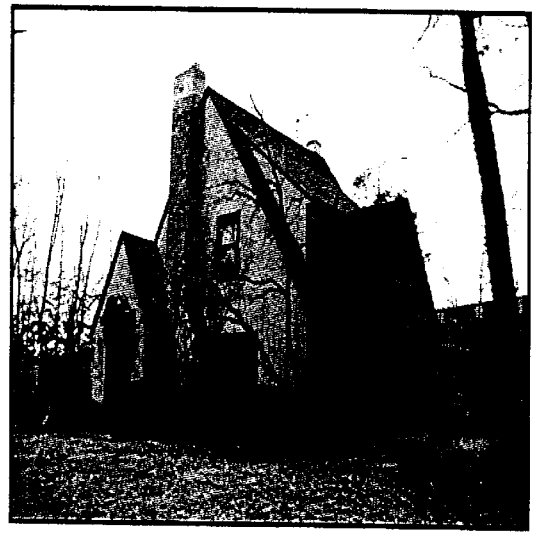

FIGS. 11A–11D show an image of a photograph wherein the threshold level=128. FIG. 11A is the image without dynamic range adjustment. FIG. 11B is the image with the dynamic range adjusted using Equation 17. FIG. 11C is the image with the dynamic range adjusted using Equation 18. FIG. 11D is the image with the dynamic range adjusted using Equation 19.

Figure 12A:
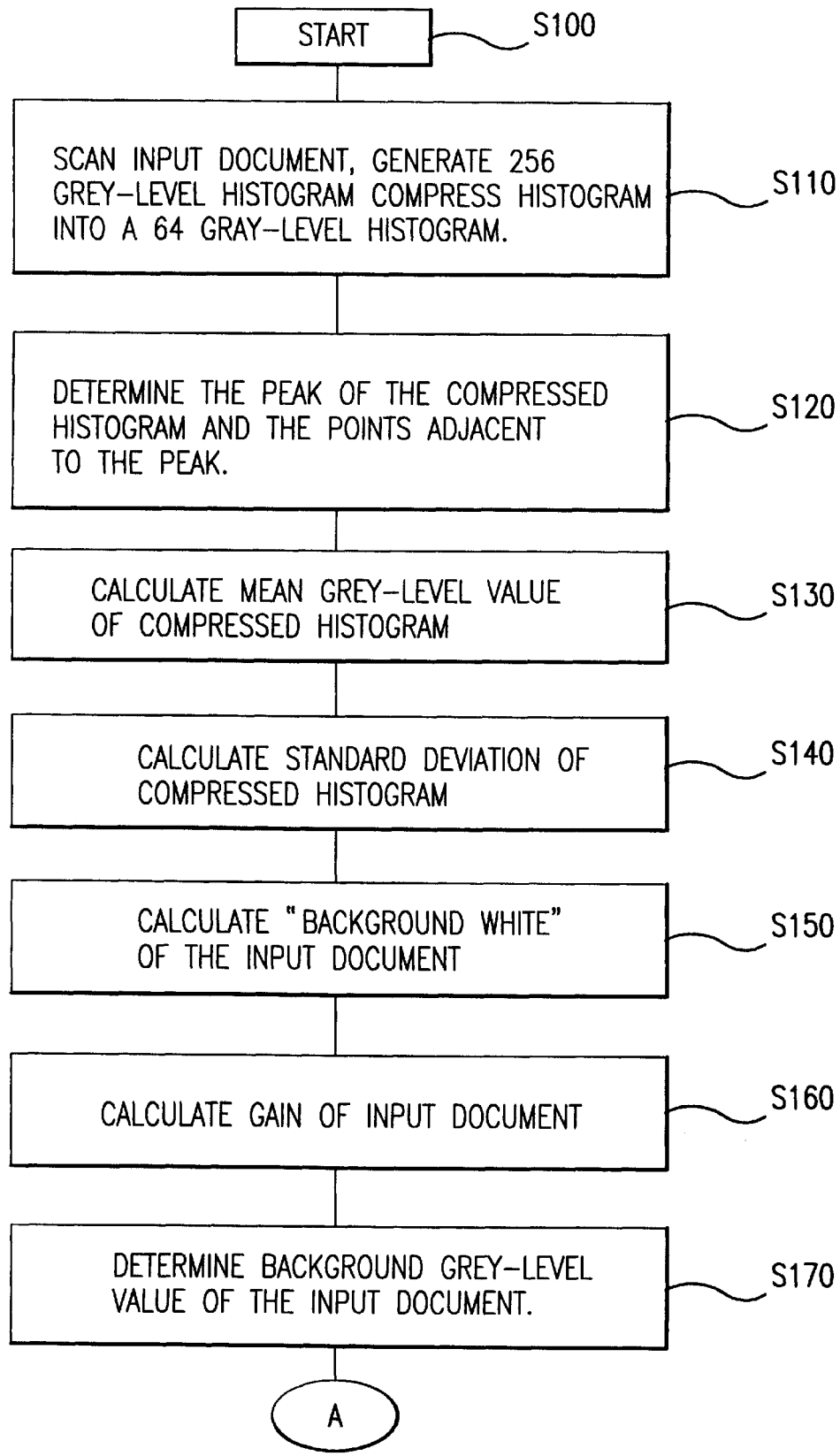
FIGS. 12A and 12B are a flowchart of one method of the invention.
Figure 12B:
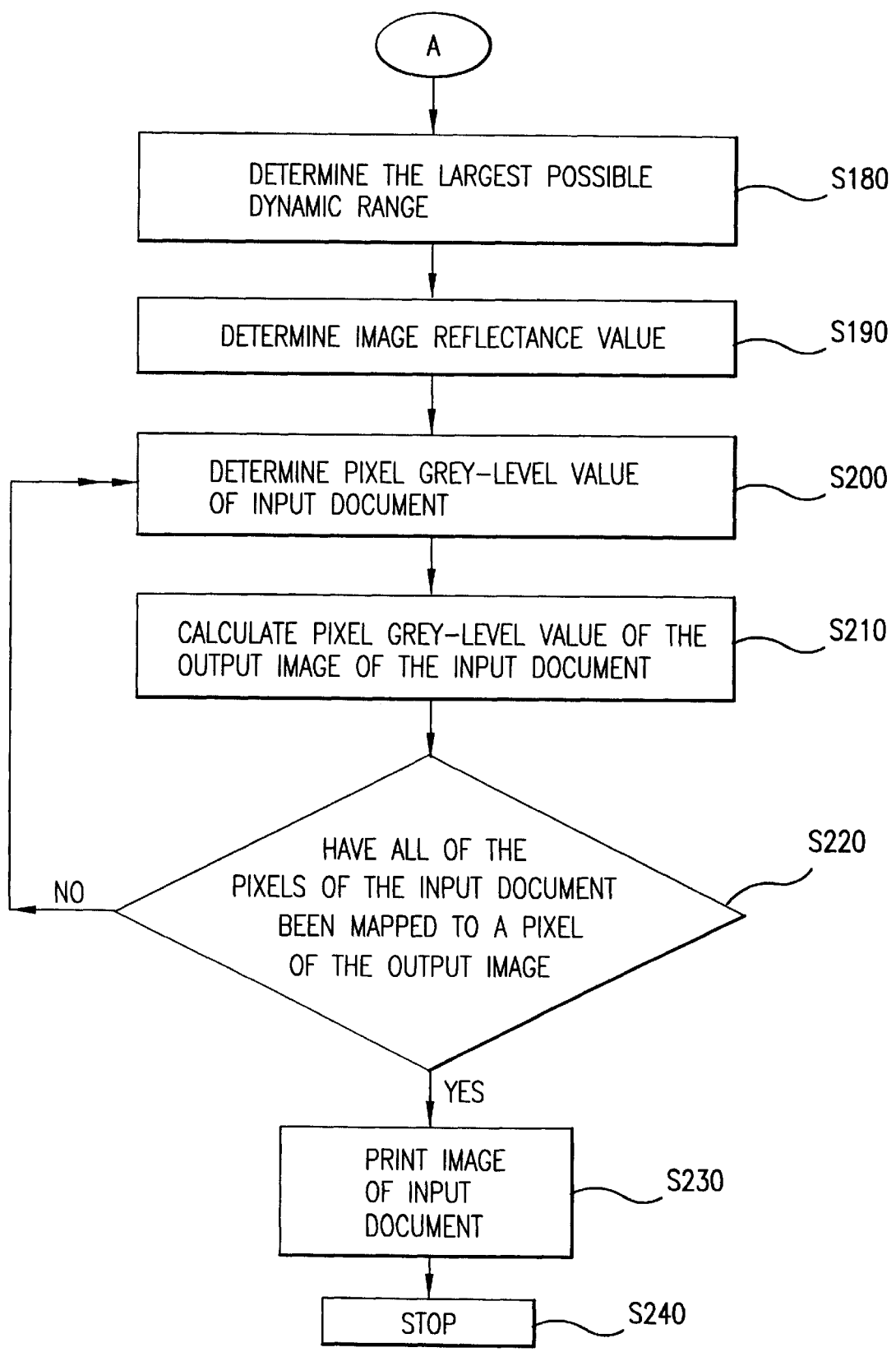

FIGS. 12A and 12B show one method for determining the background grey-level of an input document. After starting in step S100, control continues to step S110. In step S110, an input document is scanned, a 256 grey-level histogram is generated and the histogram is compressed into a 64 grey-level histogram. In S120, the peak of the compressed histogram and the points adjacent to the peak are determined.

In step S130, the mean grey-level value of the compressed histogram is calculated. In the first preferred method, $X_{max}$ is equivalent to the mean. In the second preferred method, the mean is calculated using Equation 10.

In step S140, the standard deviation of the compressed histogram is calculated. In the first preferred method, the standard deviation is calculated using Equation 7. In the second preferred method, the standard deviation is calculated using Equation 14.

In step S150, the background white of the input document is calculated. In the first preferred method, the background white is calculated using Equation 8. In the second preferred method the background white, is calculated using Equation 16.

In step S160, the gain G of the input document is calculated. In the first preferred method, the gain G is calculated using Equation 9. In the second preferred method, the gain G is calculated using Equation 15.

In step S170, the background grey-level value is determined using the gain G. This value is used to determine the adjusted dynamic range of an image of the input document.

Next, in step S180, the largest possible dynamic range is determined. In step S190, the image reflectance value is determined. In step S200, the pixel grey-level values of the input document are determined. In step S210, the pixel grey-level values of an output image of the input document are calculated. In step S220, the control routine determines whether all of the pixels of the input document have been mapped to the pixels of the output image of the input document. If all of the pixels have not been mapped, control returns to step S220. If all of the pixel have been mapped, control continues to step S230. In step S230, the output image of the input document is printed. Control then continues to step S240, where the control routine stops.

Figure 13:
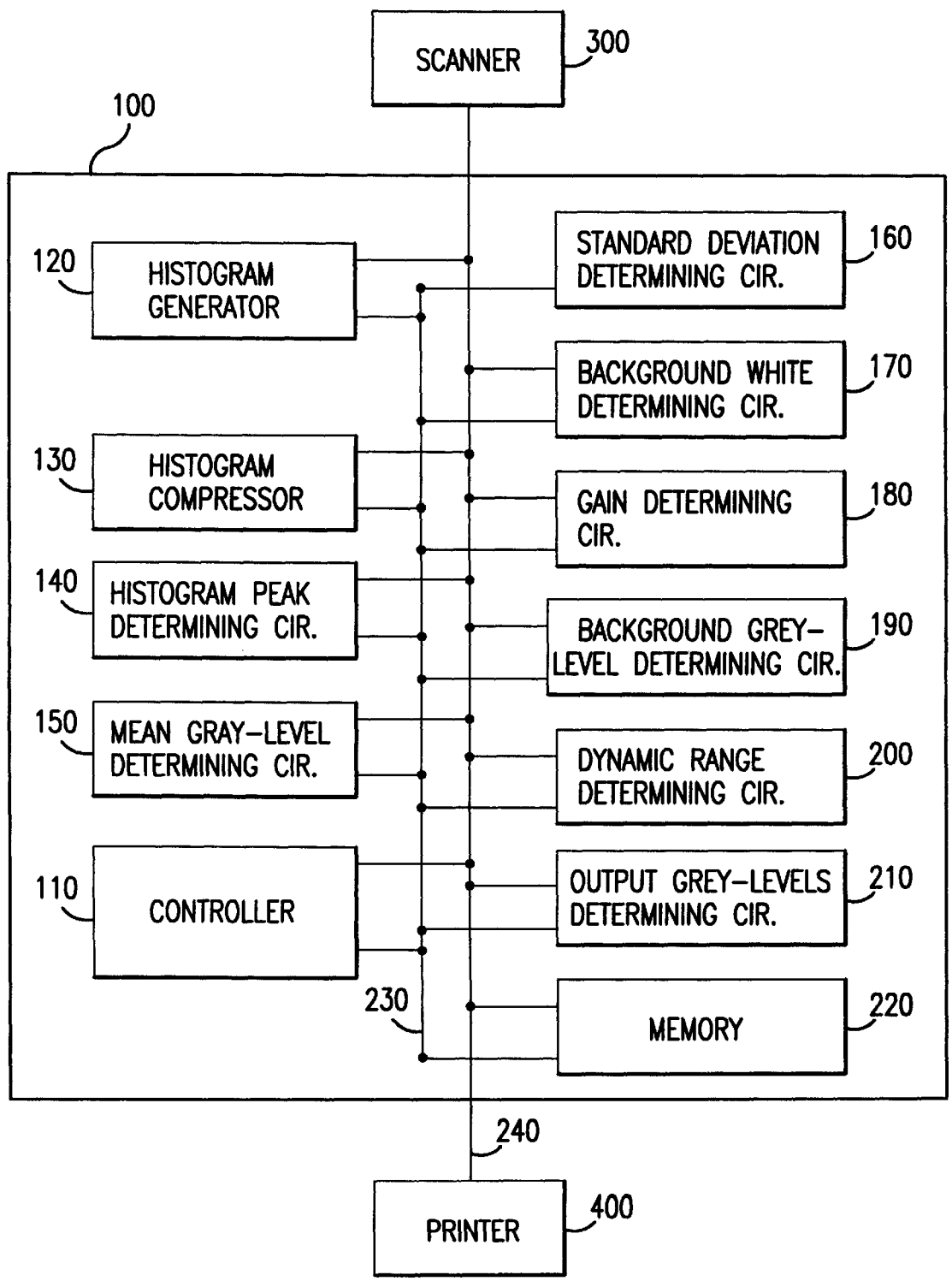
FIG. 13 is a block diagram of an apparatus built according to this invention.

FIG. 13 shows a block diagram of a document background determining and dynamic range adjusting system 100 used to implement the preferred methods of this invention. The scanner 300 scans the input document. The histogram generator 120 generates a 256 grey-level histogram. The histogram compressor 130 compresses the histogram into a 64 grey-level histogram. The histogram peak determining circuit 140 determines the peak frequency values of the compressed histogram. The mean grey-level determining circuit 150 calculates the mean grey-level value of the compressed histogram. The standard deviation determining circuit 160 calculates the standard deviation of the compressed histogram. The background white determining circuit 170 calculates the "background white" of the input document. The gain determining circuit 180 calculates the gain of the input document. The background grey-level determining circuit 190 determines the background grey-level value of the input document. The dynamic range determining circuit 200 determines the dynamic range of an image of the input document. The output grey-level determining circuit 210 determines the output grey-level values of the output image of the input document. The memory 220 stores the output image of the input document. The controller 110 sends control signals to the various circuits 120–210 through a control bus 230. Data flows between the various circuits 120–210, the controller 110 and the memory 220 through a data bus 240. A printer 400 inputs the image of the input document and generates a hard copy of the image. The scanner 300 and the printer 400 are connected to the document background determining and dynamic range adjusting system 100 through the data bus 240.

As shown in FIG. 13, the system 100 is preferably implemented on a programmed general purpose computer. However, the system 100 can also be implemented on a special purpose computer, a programmed microprocessor or microcontroller and peripheral integrated circuit elements, an ASIC or other integrated circuit, a hardwired electronic or logic device such as a discrete element circuit, a programmable logic device such as a PLD, PLA, FPGA, or the like. In general, any device on which a finite state machine capable of implementing the flowcharts shown in FIGS. 12A and 12B can be used to implement the document background determining and dynamic range adjusting system 100.

Figure 14:
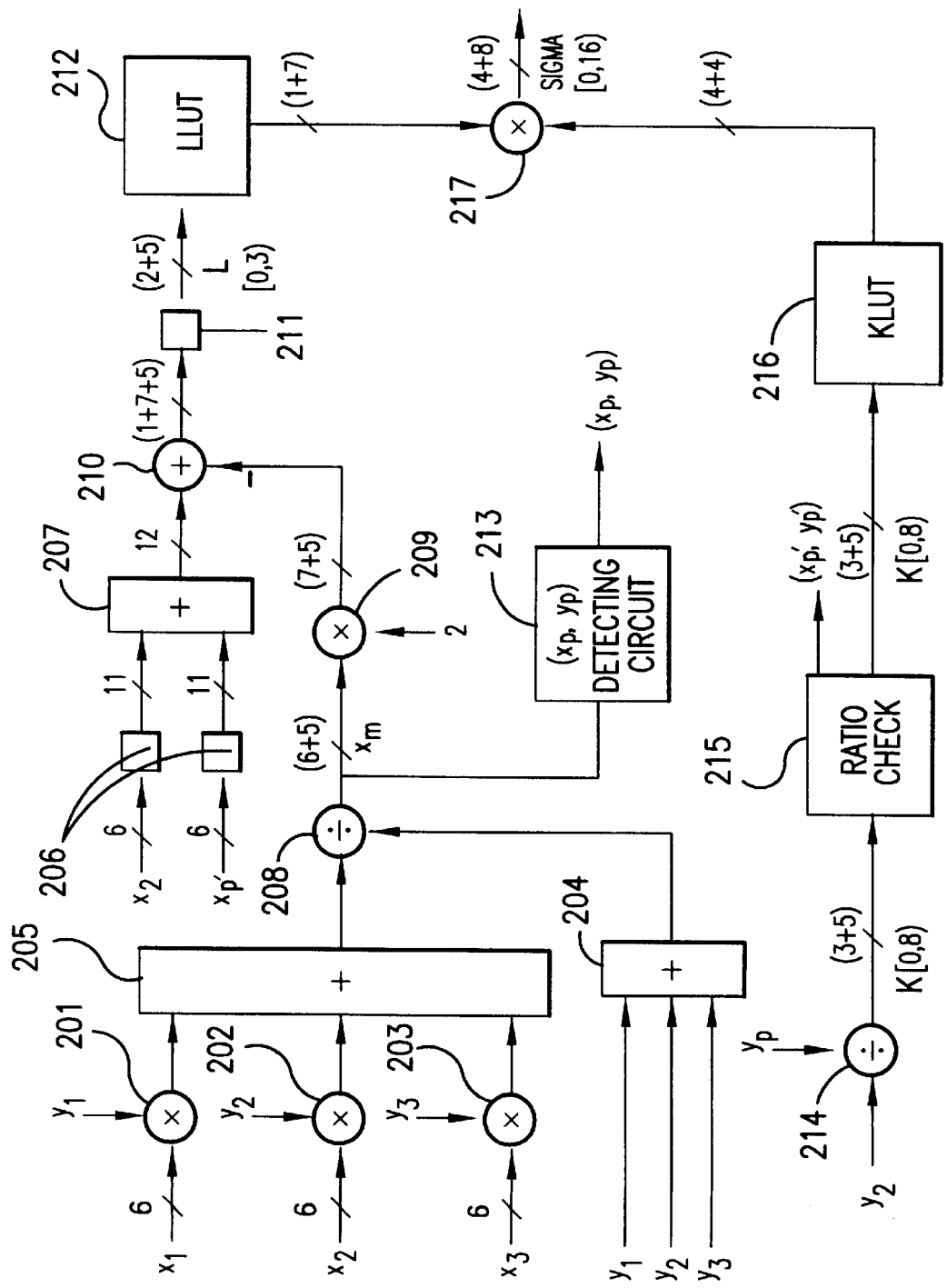
FIG. 14 is a block diagram of the mean grey-level and standard deviation calculation circuit.

FIG. 14 shows one hardware implementation of the mean grey-level determining circuit S150 and the standard deviation determining circuit S160 using Equations 10 and 14, respectively. The input to these circuits are the peak $(x_2,y_2)$ of the compressed histogram and its two neighboring points $(x_1,y_1)$ and $(x_3, y_3)$, as shown in FIG. 8. Each of the points are fed into the multipliers 201, 202 and 203. Their individual products $(x_1*y_1)$, $(x_2*y_2)$, $(x_3*y_3)$ are computed. The resultants are then fed into the adder 205 to obtain $(x_1*y_1+x_2*y_2+x_3*y_3)$. Simultaneously, the sum of the $y_1-y_3$ is computed through the adder 204. The obtained sum $(y_1+y_2+y_3)$ and the result from the previous step are fed into the divider 208 to produce the mean grey-level $x_m$, as shown in Equation 10.

The mean grey-level $x_M$ is then fed into a detecting circuit 213 to determine the closest grey-level bin from $x_1$ and $x_2$ and its corresponding bin value. These points are shown in FIG. 14 as $x_p$ and $y_p$, respectively. $y_1$ and $y_2$ are then fed into a divider 214 to obtain the peak ratio K. This ratio K is tested to see if it is greater than a ratio limit in the ratio check circuit 215. If K is greater than the ratio limit, then $(x_p,y_p)$ is not modified. On the other hand, if K is less than or equal to the ratio limit, then $x_p$ is replaced with the other point and yp is replaced by its corresponding bin value to obtain $(x_{p'},y_{p'})$ and the new peak ratio K. The 8-bit (comprising a 3-bit integer and a 5-bit fraction) peak ratio K acts as an input to the KLUT circuit 216. The KLUT contains 256×8-bit look-up table LUT for the square root of an inverse natural logarithmic function $\sqrt{8/\log_e K}$. Simultaneously, $x_2$ and $x_{p'}$ are concatenated with leading zeros at the concatenating circuit 206 to obtain 11-bit numbers which are fed into an adder circuit 207. The mean grey-level $x_M$ is shifted left by one bit at the multiplier 209 and subtracted from the output of the adder circuit 207 at the adder 210. The resultant $(L=x_2+x_p-2x_m)$ is reduced to a 7-bit number, comprising a 2-bit integer, at the truncation circuit 211 and is fed into LLUT circuit 212. The LLUT circuit 212 contains 128×8-bit LUT for a simple square root function $\sqrt{L}$. The outputs from the LUTs 216 and 212 are then fed into a multiplier 217 to obtain the standard deviation σ, as shown in Equation 14.

Figure 15:
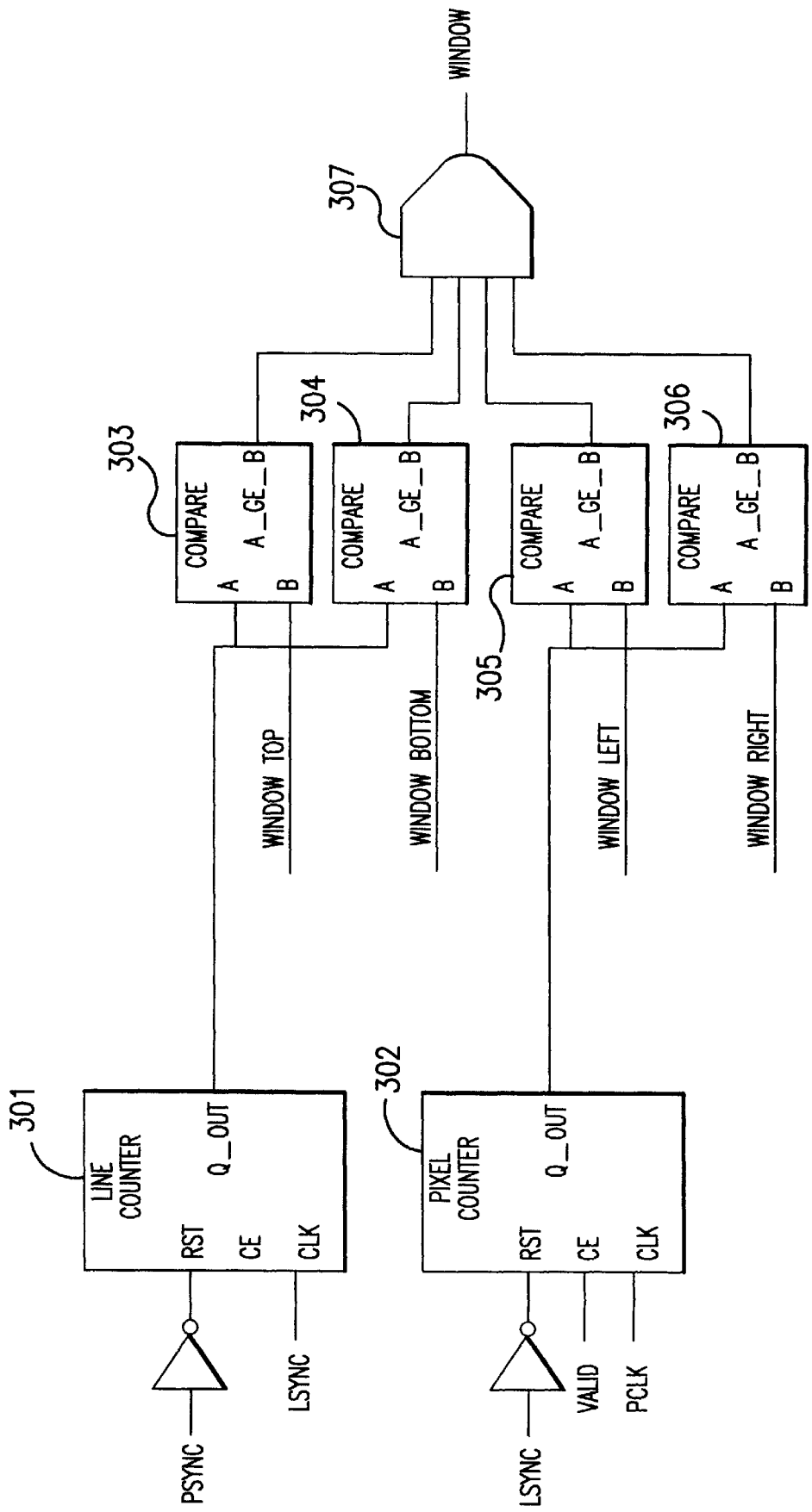
FIG. 15 is a histogram window generator circuit.

FIG. 15 shows the circuit which generates the histogram windows. The circuit could be programmed to collect a histogram within a rectangular window (as specified in the WINDOW TOP, WINDOW BOTTOM, WINDOW LEFT and WINDOW RIGHT signals) at any location within the input document. The line counter circuit 301 receives a page sync (PSYNC) signal and a line sync (LSYNC) signal from an image input terminal (IIT) . The line counter circuit 301 increments a counter for each new input scanline data to keep track of the current line position. The IIT may be a digital platen scanner or a constant velocity transport digital scanner. The comparator circuits 303 and 304 determine if the given scanline is between the WINDOW TOP and WINDOW BOTTOM coordinate signals. The pixel counter circuit 302 receives the line sync signal (LSYNC), a video valid signal and a clock signal. The pixel counter circuit 302 increments a counter for each new valid input pixel to keep track of the pixel position within a particular scanline of data. The comparator circuits 305 and 306 determine if the given scanline is between the WINDOW LEFT and WINDOW RIGHT coordinate signals. The results of the comparators 303, 304, 305 and 306 are fed into an AND gate 307 to produce the output WINDOW signal. The WINDOW signal is therefore high or valid only when the current pixel being processed is within the specified rectangular window.

While this invention has been described above in conjunction with specific embodiments, it is evident that many alternatives, modifications and variations will become apparent to those skilled in the art upon consideration of the foregoing description. Accordingly, it is intended that the present invention embrace all such alternatives, modifications and variations as fall within the spirit and broad scope of the appended claims.

What is claimed is:

1. A method for determining a background grey-level of a document, comprising:

generating a histogram of grey-level values from a sampling window of the document;

smoothing the histogram;

determining a curve approximating a shape of the smoothed histogram;

determining a mean and standard deviation of the curve;

determining a gain of the document based on the mean and standard deviation and a maximum grey-level value of the histogram; and determining the background grey-level of the document based on the gain.

2. The method of claim 1, wherein smoothing the histogram comprises:

dividing the grey-level values of the histogram into a plurality of subsets, each subset including a plurality of the grey-level values;

determining, for each subset, a sum of frequency values of the plurality of the grey-level values; and dividing, for each subset, the sum of frequency values by a number of the plurality of the grey-level values in that subset.

3. The method of claim 1, wherein determining the curve comprises:

determining a peak frequency value for the smoothed histogram;

identifying a plurality of grey-level values adjacent to the grey-level value having the peak frequency value;

identifying frequency values of the plurality of adjacent grey-level values; and determining the curve which passes through the peak frequency value and the frequency values of the plurality of adjacent grey-level values.

4. The method of claim 3, wherein the curve is a second-order polynomial.

5. The method of claim 3, wherein the plurality of adjacent grey-level values includes the two grey-level values immediately adjacent to the grey-level value having the peak frequency.

6. The method of claim 3, wherein the adjacent grey-level values include the grey-level values of the histogram whose frequency values are closest to $F_v e^{-0.5}$, where e is the base of the natural logarithm and $F_v$ is the peak frequency value.

7. The method of claim 1, further comprising adjusting a dynamic range of a pixel of an image of the document based on the determined background grey-level.

8. The method of claim 7, wherein adjusting the dynamic range comprises:
   determining an original pixel value of the image;
   determining a largest possible dynamic range of the image;
   determining an image reflectance value such that a sum of image areas containing reflectances below the determined image reflectance value is less than a predetermined percentage of a total area of the image;
   determining a difference between the original pixel value and the determined image reflectance value;
   determining a difference between the determined background grey-level and the determined image reflectance value; and
   determining a new pixel value of the image based on the original pixel value, the determined image reflectance value, the largest possible dynamic range of the image and the determined background grey-level of the image.

9. A method for determining the background grey level of a document, comprising:
   generating a histogram of grey-level values from a sampling window of the document;
   compressing the histogram;
   determining a distribution curve of the compressed histogram;
   determining a mean and standard deviation of the distribution curve;
   determining a gain factor based on the mean and standard deviation; and
   determining the background grey-level of the document based on the gain factor.

10. The method of claim 9, wherein compressing the histogram comprises:
   dividing the grey-level values of the histogram into a plurality of subsets, each subset including a plurality of the grey-level values;
   determining, for each subset, a sum of frequency values of the plurality of the grey-level values; and
   dividing, for each subset, the sum of frequency values by a number of the plurality of the grey-level values of that subset.

11. The method according to claim 9, wherein determining the distribution curve comprises:
   determining a peak frequency value for the compressed histogram;
   identifying a plurality of grey-level values adjacent to the grey-level value having the peak frequency value;
   identifying frequency values of the plurality of adjacent grey-level values; and
   determining the distribution curve which passes through the peak frequency value and the frequency values of the plurality of adjacent grey-level values.

12. The method of claim 11, wherein the distribution curve is a second-order polynomial.

13. The method of claim 11, wherein the plurality of adjacent grey-level values include the two grey-level values immediately adjacent to the grey-level value having the peak frequency.

14. The method of claim 9, further comprising adjusting a dynamic range of a pixel of an image of the document based on the determined background grey-level.

15. The method of claim 14, wherein adjusting the dynamic range comprises:
   determining an original pixel value of the image;
   determining a largest possible dynamic range of the image;
   determining an image reflectance value such that a sum of image areas containing reflectances below the determined image reflectance value is less than a predetermined percentage of a total area of the image; and
   determining a new pixel value of the image based on the original pixel value, the determined image reflectance value, the largest possible dynamic range of the image and the determined background grey-level of the image.

16. A method for adjusting a dynamic range of a pixel of an image of a document, comprising:
   obtaining an original pixel grey-level value of the image;
   determining a largest possible dynamic range of the image;
   determining an image reflectance value such that a sum of image areas containing reflectances below the determined image reflectance value is less than a predetermined percentage of a total area of the image;
   determining a background grey-level of the image; and
   determining a new pixel value of the image of the document based on the original pixel value, the determined image reflectance value, the largest possible dynamic range of the image and the determined background grey-level of the image.

17. A method for adjusting a dynamic range of a pixel of an image of a document, comprising:
   determining an original pixel value of the image;
   determining a largest possible dynamic range of the image;
   determining an image reflectance value such that a sum of image areas containing reflectances below the determined image reflectance value is less than a predetermined percentage of a total area of the image;
   determining a background grey-level of the image, comprising:
      generating a histogram from a sampling window of the document,
      smoothing the histogram,
      determining a curve approximating a shape of the smoothed histogram,
      determining a mean and standard deviation of the curve,
      determining a gain of the document based on the mean and standard deviation and a maximum grey-level value of the histogram, and
      estimating the background grey-level of the document based on the gain, and
   determining a new pixel value of the image of the document based on the original pixel value, the largest possible dynamic range of the image, the determined image reflectance value, and the determined background grey-level of the image.

18. The method for adjusting the dynamic range of an image according to claim 17, wherein smoothing the histogram comprises:
dividing the grey-level values of the histogram into a plurality of subsets, each subset including a plurality of the grey-level values;
determining, for each subset, a sum of frequency values of the plurality of the grey-level values; and
dividing, for each subset, the sum of frequency values by a number of the plurality of the grey-level values of that subset.

19. The method for adjusting the dynamic range of an image according to claim 17, wherein determining the curve comprises:
determining a peak frequency value for the histogram;
identifying a plurality of grey-level values adjacent to the grey-level value having the peak frequency value;
identifying frequency values of the plurality of adjacent grey-level values; and
determining the curve which passes through the peak frequency value and the frequency values of the plurality of adjacent grey-level values.

20. The method for adjusting the dynamic range of an image according to claim 19, wherein the curve is a second-order polynomial.

21. The method for adjusting the dynamic range of an image according to claim 19, wherein the plurality of adjacent grey-level values include the two grey-level values immediately adjacent to the grey-level value having the peak frequency.

22. The method for adjusting the dynamic range of an image according to claim 19, wherein the adjacent grey-level values include the grey-level values of the histogram whose frequency values are closest to $F_v e^{-0.5}$, where e is the base of the natural logarithm and $F_v$ is the peak frequency value.

23. A method for adjusting a dynamic range of a pixel of an image of a document, comprising:
determining an original pixel value of the image;
determining a largest possible dynamic range of the image;
determining an image reflectance value such that a sum of image areas containing reflectances below the determined image reflectance value is less than a predetermined percentage of a total area of the image;
determining a background grey-level of the image, comprising:
generating a histogram of grey-level values from a sampling window of the document,
compressing the histogram,
determining a distribution curve of the compressed histogram,
determining a standard deviation of the distribution curve,
determining a gain factor based on the standard deviation, and
determining the background grey-level of the document based on the gain factor; and
determining a new pixel value of the image of the document based on the original pixel value, the largest possible dynamic range of the image, the determined image reflectance value, and the determined background grey-level of the image.

24. The method for adjusting the dynamic range of an image according to claim 23, wherein compressing the histogram comprises:
dividing the grey-level values of the histogram into a plurality of subsets, each subset including a plurality of the grey-level values;
determining, for each subset, a sum of frequency values of the plurality of the grey-level values; and
dividing, for each subset, the sum of frequency values by a number of the plurality of the grey-level values of that subset.

25. The method for adjusting the dynamic range of an image according to claim 23, wherein determining the distribution curve comprises:
determining a peak frequency value for the compressed histogram;
identifying a plurality of grey-level values adjacent to the grey-level value having the peak frequency value;
identifying frequency values of the plurality of adjacent grey-level values; and
determining the distribution curve which passes through the peak frequency value and the frequency values of the plurality of adjacent grey-level values.

26. The method of claim 25, wherein the plurality of adjacent grey-level values include the two grey-level values immediately adjacent to the grey-level value having the peak frequency.

27. A method for adjusting a dynamic range of a pixel of an image of an input document, the method comprising:
generating a histogram of grey-level values from a sampling window of the document;
smoothing the histogram;
determining a curve approximating a shape of the smoothed histogram;
determining a mean and standard deviation of the curve; and
determining a gain of the document based on the mean and standard deviation and a maximum grey-level value of the histogram;
determine the background grey-level of the document based on the gain;
determining an original pixel value of the image;
determining a largest possible dynamic range of the image;
determining an image reflectance value such that a sum of image areas containing reflectances below the determined image reflectance value is less than a predetermined percentage of a total area of the image;
determining a difference between the original pixel value and the determined image reflectance value;
determining a difference between the determined background grey-level and the determined image reflectance value; and
determining a new pixel value of the image based on the original pixel value, the determined image reflectance value, the largest possible dynamic range of the image and the determined background grey-level of the image.

28. The method of claim 15, further comprising:
determining a difference between the original pixel value and the determined image reflectance value; and
determining a difference between the determined background grey-level and the determined image reflectance value;
wherein determining the new pixel value of the image is based on the determined difference between the original pixel value and the image reflectance value and the determined difference between the background grey-level of the image and the image reflectance value.

29. The method of claim 16, further comprising:

determining a difference between the original pixel value and the determined image reflectance value; and determining a difference between the determined background grey-level and the determined image reflectance value;

wherein determining the new pixel value of the image is based on the determined difference between the original pixel value and the image reflectance value and the determined difference between the background grey-level of the image and the image reflectance value.

* * * * *